Patented Sept. 27, 1938

2,131,480

UNITED STATES PATENT OFFICE 2,131,480

VAT DYESTUFFS OF THE ANTHRAQUINONE SERIES

Heinrich Neresheimer and Wilhelm Ruppel, Ludwigshafen-on-the-Rhine, Germany, assignors to General Aniline Works, Inc., New York, N. Y., a corporation of Delaware No Drawing. Application October 17, 1936, Serial No. 106,197. In Germany October 24, 1935

14 Claims. (Cl. 260—262)

The present invention relates to new vat dyestuffs.

We have found that valuable new vat dyestuffs are obtained by splitting off hydrogen halide from compounds corresponding to the general formula:

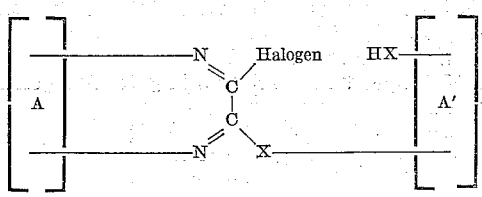

wherein A and A' are identical or different radicles of anthraquinones in which the two linkages shown are attached to adjacent positions, and wherein the X's may be oxygen, sulphur or an NH-group, at least one of the X's being an NH-group. The starting materials may also be compounds which are converted into the said compounds under the reaction conditions.

The said starting materials may in part be prepared according to the process of our copending application Ser. No. 70,406, filed March 23, 1936. The splitting off of the hydrogen halide may be effected for example by means of concentrated or comparatively dilute acids or by simple heating, if desired in the presence of a diluent. In some cases it is of advantage to add an agent capable of binding acids.

The vat dyestuffs obtainable according to our invention are generally speaking obtained in very good yields. They have good properties as regards fastness.

Furthermore we have found that vat dyestuffs which yield dyeings having excellent fastness to alkali and washing are obtained by treating the dyestuffs obtainable in the above described manner with alkylating agents. As alkylating agents may be mentioned for example arylsulphonic acid alkyl esters, alkyl sulphates and alkyl halides. The alkylated dyestuffs may be purified if desired by treatment with hypochlorite.

The following examples will further illustrate how the said invention may be carried out in practice but the invention is not restricted to these examples. The parts are by weight.

Example 1

A mixture of 10 parts of the compound obtainable from 1 molecular proportion of Pz-dichlor-1.2-pyrazinoanthraquinone and 1 molecular proportion of 1.2-diaminoanthraquinone by heating the two components in the presence of nitrobenzene for some time at 110° C. and filtering off the red-brown needles formed, and 15 parts of nitrobenzene is boiled until hydrogen chloride no longer escapes. After cooling, the resulting compound is filtered off by suction, washed with nitrobenzene, freed from adherent nitrobenzene by means of steam and dried. The olive green compound thus obtained may be purified by dissolving it in 100 parts of 96 per cent sulphuric acid and heating the solution with 10 parts of pyrolusite at about 90° C. until the dyestuff when diluted with water is precipitated in pure yellow flocks. The solution is then poured onto ice, the excess of pyrolusite is removed by boiling with an addition of sodium bisulphite and the dyestuff is filtered off by suction, washed and dried. The dyestuff thus obtained yields with alkaline hydrosulphite solution a red-brown vat from which cotton is dyed vivid yellow shades.

The same dyestuff is formed by heating the starting material with 10 times its amount of 96 per cent sulphuric acid for a short time at 130° C. and then further proceeding as described above.

10 parts of the dyestuff obtained in the manner described above are introduced into a mixture, heated to 200° C., of 100 parts of trichlorbenzene and 20 parts of anhydrous potash, para-toluenesulphonic acid methyl ester being added in small amounts until a sample withdrawn after boiling for several hours yields from the vat a yellow cotton dyeing which no longer changes to brown when spotted with alkali. The dyestuff is then filtered off by suction at from 120° to 150° C., washed with alcohol and water and dried. It dyes cotton powerful yellow shades fast to washing from a bluish red vat.

The same dyestuff can be prepared by using dimethyl sulphate or methyl chloride as the alkylating agent.

Similar dyestuffs are obtained by using other alkyl esters of para-toluene sulphonic acid, as for example the ethyl or chlorethyl esters, instead of the methyl ester.

Example 2

10 parts of the compound obtainable by introducing 6.3 parts of 1.2-diamino-3-bromanthraquinone into a suspension of 6.6 parts of Pz-dichlor-1.2-pyrazinoanthraquinone in 120 parts of nitrobenzene at 80° C. and then heating the mixture at about 100° C. until hydrogen chloride no longer escapes, are introduced at 160° C. into 100 parts of 96 per cent sulphuric acid. When dissolution is completed, the mixture is heated for a short time at from 190° to 195° C., cooled to about 80° C., 10 parts of pyrolusite being introduced at the latter temperature. After heating at about 100° C. for a short time, the solution is poured into water. The separated yellow dyestuff is very similar to that described in the first paragraph of Example 1.

By employing as starting material the compounds obtainable from Pz-dichlor-1.2-pyrazinoanthraquinone and other halogen derivatives of 1.2-diaminoanthraquinone, as for example 1.2-diamino-4-chloranthraquinone, or 2.3-diaminoanthraquinone, similar dyestuffs are obtained.

10 parts of the dyestuff obtained according to the method described in the first paragraph of this example are introduced at 200° C. into a mixture of 120 parts of trichlorbenzene and 20 parts of potash, 20 parts of para-toluene sulphonic acid ethyl ester being added and the mixture heated to boiling until the dyeing obtained with a sample withdrawn on cotton no longer changes with alkalies. The whole is then worked up in the manner described in Example 1. The dyestuff is purified if necessary for example by treatment with sodium hypochlorite. It dyes cotton greenish yellow shades fast to alkali and washing from a bluish-red vat.

*Example 3*

10 parts of the compound obtainable by introducing at 80° C. 6.3 parts of 1.2-diamino-3-bromanthraquinone into a solution of 7.8 parts of 3-chlor-Pz-dichlor-1.2-pyrazinoanthraquinone in 120 parts of nitrobenzene and heating the mixture for several hours at 110° C., are introduced at 160° C. into 100 parts of 96 per cent sulphuric acid. The solution is heated for a short time at 200° C. and is then worked up in the manner described in Example 2. The dyestuff thus obtained dissolves in concentrated sulphuric acid giving a brown coloration and dyes cotton powerful yellow shades from a red-brown vat.

By starting from the compounds obtainable from 3-chlor-Pz-dichlor-1.2-pyrazinoanthraquinone and 1.2-diaminoanthraquinone or 1.2-diamino-4-chloranthraquinone, or from the compound obtainable from 4-chlor-Pz-dichlor-1.2-pyrazinoanthraquinone and 1.2-diaminoanthraquinone according to Example 14 of our copending application, yellow vat dyestuffs having similar properties are also obtained. The dyestuffs may be alkylated by treatment with para-toluene sulphonic acid alkyl esters in the manner described in Example 1.

*Example 4*

5.1 parts of 1-mercapto-2-aminoanthraquinone are added at 40° C. to a suspension of 6.6 parts of Pz-dichlor-1.2-pyrazinoanthraquinone in 150 parts of nitrobenzene, the mixture then being heated for several hours at from 50° to 60° C. A red-brown compound thus separates with evolution of hydrogen chloride; the compound is separated in the usual manner. It dissolves in concentrated sulphuric acid giving a carmine red coloration.

10 parts of the compound thus obtained are introduced at 200° C. into 100 parts of sulphuric acid monohydrate. This solution is heated for a short time at from 220° to 230° C. its color thus changing from bluish red to olive brown. The whole is worked up and purified in the manner described in Example 2. The yellow dyestuff obtained dissolves in concentrated sulphuric acid giving a brown coloration and dyes cotton clear yellow shades from a red-brown vat.

If the compound derived from dichlor-pyrazinoanthraquinone and 1-amino-2-mercaptoanthraquinone be employed as starting material, a yellow vat dyestuff is also obtained.

10 parts of the dyestuff prepared in the manner described above are introduced into a mixture, heated to 200° C., of 100 parts of trichlorbenzene and 20 parts of potash, 20 parts of para-toluene-sulphonic acid methyl ester then being added and the mixture heated to boiling for several hours. The dyestuff is filtered off by suction at about 140° C. and is washed with alcohol and hot water. It may be purified by treatment with sodium hypochlorite. It dyes cotton from a violet vat powerful yellow shades and has very good properties as regards fastness.

*Example 5*

10 parts of the red-brown compound which can be obtained by introducing 6.5 parts of Pz-dichlor-1.2-pyrazinoanthraquinone at 120° C. into a solution of 5 parts of 1-amino-2-methoxyanthraquinone in 150 parts of nitrobenzene and heating the mixture for several hours, are introduced at 200° C. into 100 parts of sulphuric acid monohydrate. The solution is heated at 250° C. for a short time and worked up in the manner described in Example 2. A greenish yellow dyestuff is thus obtained which has properties similar to those of the dyestuffs described in the other examples.

What we claim is:—

1. Vat dyestuffs corresponding to the general formula

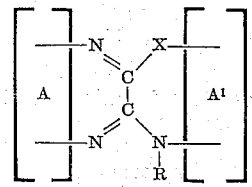

wherein A and A¹ stand for anthraquinone radicles in which the two linkages shown are attached to adjacent alpha and beta positions, wherein R stands for a member of the group consisting of hydrogen and alkyl, and wherein X stands for a member of the group consisting of N—R, and sulphur.

2. Vat dyestuffs corresponding to the general formula

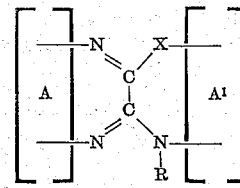

wherein A and A¹ stand for the radicles of anthraquinone in which the two linkages shown are attached to adjacent alpha and beta positions, wherein R stands for a member of the group consisting of hydrogen and alkyl, and wherein X stands for a member of the group consisting of N—R, and sulphur.

3. Vat dyestuffs corresponding to the general formula

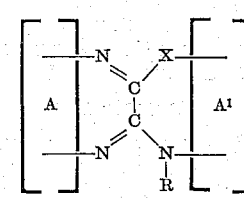

wherein A and A¹ stand for radicles of halogenanthraquinones in which the two linkages shown are attached to adjacent alpha and beta positions, wherein R stands for a member of the group consisting of hydrogen and alkyl, and wherein X stands for a member of the group consisting of N—R, and sulphur.

4. Vat dyestuffs corresponding to the general formula

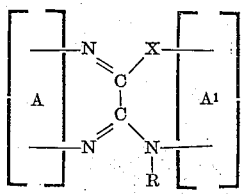

wherein A and A¹ stand for anthraquinone radicles one of which is halogenated in which the two linkages shown are attached to adjacent alpha and beta positions, wherein R stands for a member of the group consisting of hydrogen and alkyl, and wherein X stands for a member of the group consisting of N—R, and sulphur.

5. Vat dyestuffs corresponding to the general formula

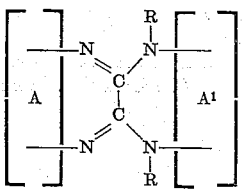

wherein A and A¹ stand for anthraquinone radicles in which the two linkages shown are attached to adjacent alpha and beta positions, and wherein R stands for a member of the group consisting of hydrogen and alkyl.

6. Vat dyestuffs corresponding to the general formula

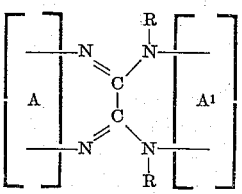

wherein A and A¹ stand for anthraquinone radicles in which the two linkages shown are attached to adjacent alpha and beta positions, and wherein R stands for alkyl.

7. The vat dyestuff corresponding to the formula

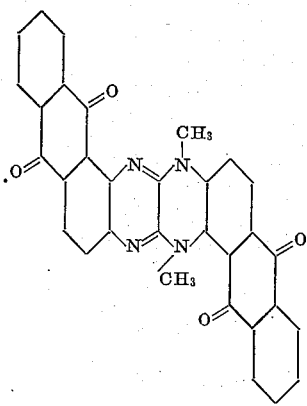

which dyes cotton yellow shades from a red-brown vat.

8. Vat dyestuffs corresponding to the general formula

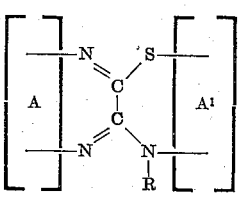

wherein A and A¹ stand for the radicles of anthraquinone in which the two linkages shown are attached to adjacent alpha and beta positions, and wherein R stands for a member of the group consisting of hydrogen and alkyl.

9. Vat dyestuffs corresponding to the general formula

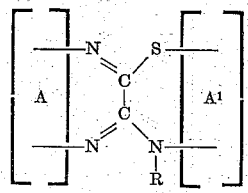

wherein A and A¹ stand for the radicle of anthraquinone in which the two linkages shown are attached to adjacent alpha and beta positions, and wherein R stands for alkyl.

10. The vat dyestuff corresponding to the formula

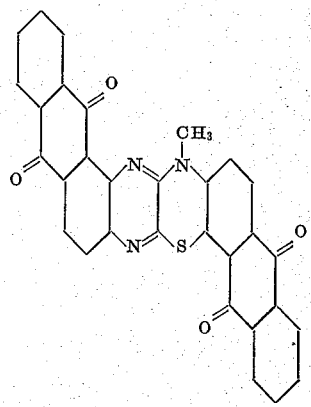

which dyes cotton yellow shades from a red-brown vat.

11. Vat dyestuffs corresponding to the general formula

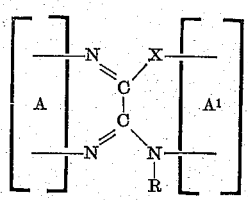

wherein A stands for the radicle of anthraquinone, wherein A¹ stands for a halogenated anthraquinone radicle in which radicles the two linkages shown are attached to adjacent alpha and beta positions, wherein R stands for a member of the group consisting of hydrogen and alkyl, and wherein X stands for a member of the group consisting of N—R and sulphur.

12. Vat dyestuffs corresponding to the general formula

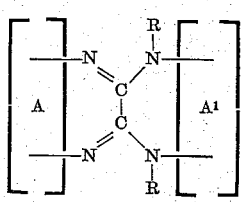

wherein A stands for the radicle of anthraquinone, wherein A¹ stands for a halogenated anthraquinone radicle in which radicles the two linkages shown are attached to adjacent alpha and beta positions, and wherein R stands for a member of the group consisting of hydrogen and alkyl.

13. Vat dyestuffs corresponding to the general formula

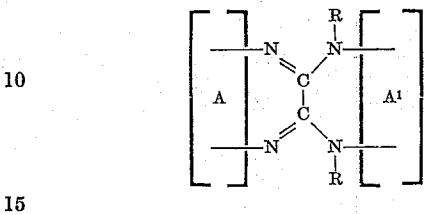

wherein A stands for the radicle of anthraquinone, wherein $A^1$ stands for a halogenated anthraquinone radicle in which radicles the two linkages shown are attached to adjacent alpha and beta positions and wherein R stands for alkyl.

14. The vat dyestuff corresponding to the formula

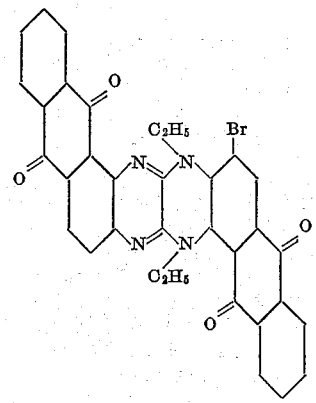

which dyes cotton greenish yellow shades from a bluish-red vat.

HEINRICH NERESHEIMER.
WILHELM RUPPEL.